United States Patent
Nakabayashi

(10) Patent No.: US 7,294,293 B2
(45) Date of Patent: Nov. 13, 2007

(54) METHOD FOR MANUFACTURING DIFFRACTION OPTICAL ELEMENT

(75) Inventor: Masaaki Nakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 10/438,027

(22) Filed: May 15, 2003

(65) Prior Publication Data

US 2003/0218803 A1    Nov. 27, 2003

(30) Foreign Application Priority Data

May 24, 2002  (JP) ............................. 2002-150031
Apr. 24, 2003  (JP) ............................. 2003-119880

(51) Int. Cl.
    *B29D 11/00*    (2006.01)
(52) U.S. Cl. .................... 264/1.32; 264/1.38; 264/496; 359/566
(58) Field of Classification Search ............. 264/1.1, 264/1.36, 1.38, 1.7, 496, 1.32, 1.33; 359/566, 359/558; 425/808
See application file for complete search history.

(56) References Cited

U.S. PATENT DOCUMENTS 4,919,850 A  *  4/1990  Blum et al. ................. 264/1.38
4,983,335 A  *  1/1991  Matsuo et al. ............... 264/496
5,629,804 A  *  5/1997  Tomono ...................... 359/576
6,096,383 A  *  8/2000  Berg et al. ................... 427/493

FOREIGN PATENT DOCUMENTS

JP            6-59104         3/1994

OTHER PUBLICATIONS

Michael W. Farn et al., "Diffractive Doublet Corrected On-Axis at Two Wavelengths," 1354 *SPIE* 24-29(1990).

* cited by examiner

*Primary Examiner*—Mathieu D. Vargot
(74) *Attorney, Agent, or Firm*—Fitzpatrick, Cella, Harper & Scinto

(57) ABSTRACT

A method for manufacturing a diffraction optical element, according to the present invention, includes the steps of: supplying a photocurable resin onto a surface of a light-transmitting molding die in which a grating pattern is formed on the surface; irradiating the photocurable resin with light having a first wavelength through the molding die so as to cure a part of the photocurable resin; irradiating the photocurable resin with light having a second wavelength, which is longer than the firs wavelength, through the molding die so as to cure at least a part of the photocurable resin; and removing the cured resin from the molding die.

5 Claims, 6 Drawing Sheets

METHOD FOR MANUFACTURING DIFFRACTION OPTICAL ELEMENT

BACKGROUND OF THE INVENTION

1. Field of the Invention

The present invention relates to methods for manufacturing a diffraction optical element.

2. Description of the Related Art

Hitherto, as a method for compensating for chromatic aberration, a method has been known in which optical elements composed of glass materials having different scattering properties were combined together. In addition, in SPIE International Lens Design Conference, vol. 1345, pp. 24 to 29, 1990, a technique for compensating for chromatic aberration by using a diffraction optical element was disclosed.

As a method for manufacturing the diffraction optical element described above, a method has been used, which comprises the steps of preparing a molding die having a pattern corresponding to a diffraction grating, transferring the pattern to a molding material, and then removing the molding material from the molding die. As the molding material described above, photocurable resins have been widely used.

In addition, as a method for forming a pattern on the surface of the molding die, heretofore, a method has been known which uses a typical microfabrication technique, such as a photolithography technique primarily used in a semiconductor manufacturing process, or an accurate cutting technique using a diamond bit.

However, when a photocurable resin is used as the molding material, due to a large shrinkage factor thereof caused by curing, there have been problems in that concave and convex portions, which form a diffraction grating, are poorly transferred and that sufficient structural accuracy cannot be obtained. In addition, an internal stress is liable to remain in the photocurable resin, and as a result, elements may be deformed by this stress in some cases.

In order to solve the problem of the insufficient structural accuracy described above, for example, a method has been disclosed in Japanese Patent Laid-Open No. 6-59104. In this publication, when a photocurable resin is cured, a region irradiated with light is gradually increased from a central portion of an optical element to the periphery thereof while the exposure is controlled by using a shutter. The method, however, is not for manufacturing a diffraction optical element. Nevertheless, according to this method, while the resin is gradually cured from the center, the shrunk portion of the cured resin is compensated for with the feed of an uncured resin. Thus, the decrease in structural accuracy can be prevented.

However, according to the method disclosed in Japanese Patent Laid-Open No. 6-59104, in the case in which a diffraction optical element provided with a fine pattern on the surface thereof is manufactured, a satisfactory effect could not be obtained.

SUMMARY OF THE INVENTION

An object of the present invention is to solve the problems of the related techniques described above and to provide a method for manufacturing a diffraction optical element which has superior structural accuracy and which may not be deformed.

A method for manufacturing a diffraction optical element, according to the present invention, can achieve the objects described above. The method described above comprises: a step of supplying a photocurable resin onto a surface of a light-transmitting molding die in which a grating pattern is formed on the surface; a step of irradiating the photocurable resin with light having a first wavelength through the molding die so as to cure a part of the photocurable resin; a step of irradiating the photocurable resin with light having a second wavelength, which is longer than the first wavelength, through the molding die so as to cure at least a part of the photocurable resin; and a step of removing the cured resin from the molding die.

Further objects, features and advantages of the present invention will become apparent from the following description of the preferred embodiments with reference to the attached drawings.

DESCRIPTION OF THE PREFERRED EMBODIMENTS

Figure 1:
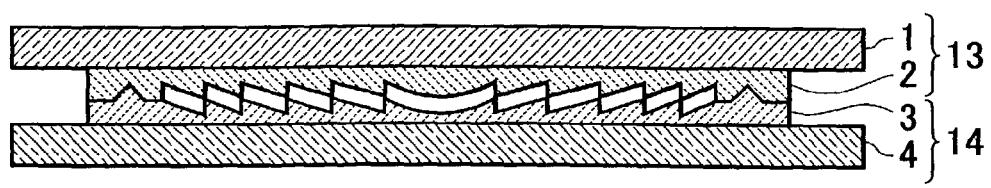
FIG. 1 is a schematic cross-sectional view showing an example of a diffraction optical element manufactured by a method according to the present invention.

FIG. 1 is a schematic cross-sectional view showing an example of a diffraction optical element manufactured by a method according to the present invention. In this embodiment, an example of a multilayer diffraction optical element is shown. This diffraction optical element is formed by bonding a first optical member 13 to a second optical member 14. The first optical member 13 is composed of a first substrate 1 and a first resin layer 2, which has a first blazed diffraction grating on a surface thereof and which is formed on the first substrate 1. The second optical member 14 is composed of a second substrate 4 and a second resin layer 3, which has a second blazed diffraction grating on a surface thereof and which is formed on the second substrate 4. These optical members are bonded to each other with an adhesive not shown in the figure so that the first and the second resin layers are disposed inside.

In the diffraction optical element shown in FIG. 1, the first substrate 1 and the second substrate 4 are each a glass substrate. The first resin layer 2 is formed of a photocurable resin, which primarily contains modified urethane acrylate, having a high refractive index and high scattering properties.

In addition, the second resin layer 3 is formed of an acrylate UV curable resin having low scattering properties. Materials for these resin layers are optionally selected so as to have the best combination thereof in accordance with optical designs suitably made for individual applications. In addition, the order of the materials forming the layers is also optionally determined. In Table 1, the materials and optical properties of the individual resin layers are shown.

TABLE 1

| | Material | Refractive Index after Curing | Abbe Number |
|---|---|---|---|
| First Resin Layer | Modified Urethane Acrylate UV curable Resin | 1.635 | 23 |
| Second Resin Layer | Urethane Modified Polyester Acrylate UV curable Resin | 1.525 | 50.8 |

When the diffraction optical element is used for an optical apparatus, such as a camera, the diffraction grating must be formed so that light flux in a used wavelength region is converged on a specific diffraction order. In this embodiment, the grating structure of the resin layer is determined so that the multilayer diffraction optical element obtains high diffraction efficiency at the c line wavelength (565.27 nm) and the g line wavelength (435.83 nm). In the structure described above, the grating height of the blazed diffraction grating formed on the first resin layer 2 is 6.74 µm, and the grating height of the blazed diffraction grating formed on the second resin layer 3 is 9.50 µm. These blazed diffraction gratings are formed so as to generate lens action. Hence, the grating pitch becomes smaller as the distance from the center of the diffraction grating is increased, and the minimum pitch is slightly smaller than 40 µm. In addition, in both blazed diffraction gratings, the grating pitches are the same.

Figure 2:
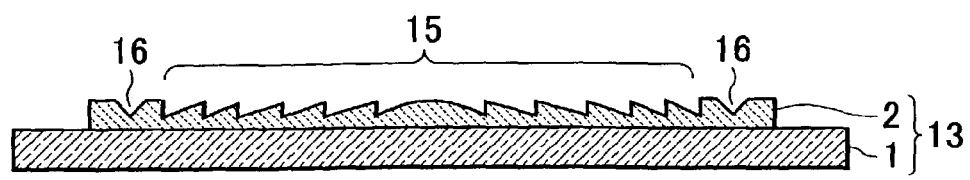
FIG. 2 is a schematic cross-sectional view of a first optical member before a bonding step thereof is performed, the first diffraction optical member forming the diffraction optical element shown in FIG. 1.
Figure 3:
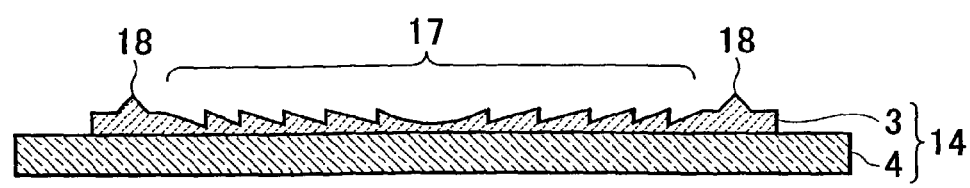
FIG. 3 is a schematic cross-sectional view of a second optical member before a bonding step thereof is performed, the second diffraction optical member forming the diffraction optical element shown in FIG. 1.

FIGS. 2 and 3 are views showing the first and the second optical members before a bonding step thereof is performed, the optical members forming the diffraction optical element shown in FIG. 1. In FIGS. 2 and 3, the same reference numerals as those in FIG. 1 designate the same components, and a detailed description thereof will be omitted.

In FIG. 2, on the surface of the first resin layer 2, a blazed diffraction grating 15 is formed. Along the peripheral portion of this blazed diffraction-grating 15, an annular concave portion 16 is formed. In addition, as shown in FIG. 3, on the surface of the second resin layer 3, a blazed diffraction grating 17 is formed. Along the peripheral portion of this blazed diffraction grating 17, an annular convex portion 18 is formed. When the first optical member 13 and the second optical member 14 are bonded to each other, the concave portion 16 and the convex portion 18 are engaged with each other, and as a result, the alignment can be made. Accordingly, the concave portion 16 and the convex portion 18 are formed so that the positions thereof from the center of the respective optical members are substantially equal to each other and that the difference therebetween is decreased to 1 µm or less.

The first and the second optical members shown in FIGS. 2 and 3, respectively, may not be bonded to each other and may also be independently used as a monolayer diffraction optical element.

Figure 4:
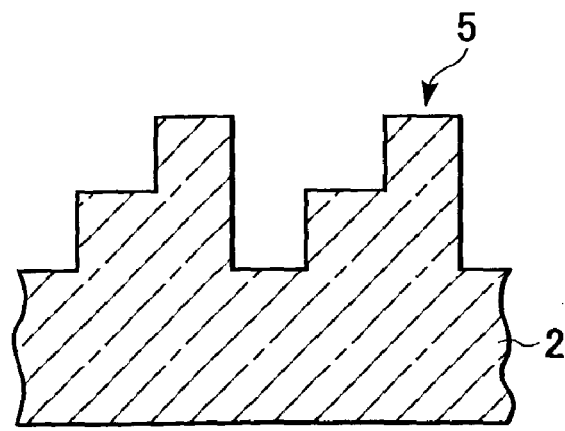
FIG. 4 is a partially enlarged cross-sectional view showing a diffraction grating portion of the optical member shown in FIGS. 2 and 3.

Thus, a multilayer diffraction optical element has been exemplified. However, it should be noted that the method according to the present invention may also be used to manufacture a monolayer diffraction optical element. In addition, in FIGS. 1 to 3, the diffraction grating portion composed of smooth inclined and vertical surfaces has been illustrated, but as shown in a partially enlarged cross-sectional view of FIG. 4, a convex portion 5 actually has a step shape. However, in addition to the diffraction optical element having the convex parts in the form of steps, the present invention can be preferably applied to the case in which a diffraction optical element composed of smooth inclined surfaces is manufactured. In addition, according to the present invention, when a diffraction optical element composed of concave and convex surfaces is formed, which are in conformity with each other, the same advantage as that obtained in the case in which the blazed diffraction grating is manufactured can also be obtained.

Figure 5:
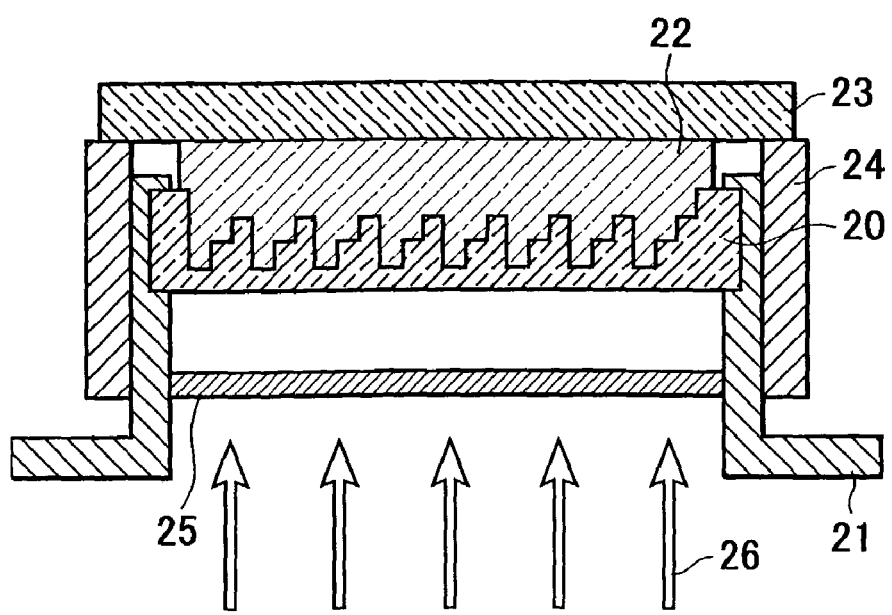
FIG. 5 is a schematic cross-sectional view showing an example of the structure of a molding apparatus used in the present invention.

FIG. 5 is a schematic cross-sectional view showing an example of the structure of a molding apparatus used for the method of the present invention. As shown in FIG. 5, a diffraction grating pattern is formed on a mold surface of a molding die 20. This molding die 20 is formed of quartz glass having light transmitting properties and is supported by a support frame 21. Onto the mold surface of the molding die 20, a photocurable resin 22 is supplied, and on this photocurable resin 22, a glass substrate 23 is placed. The support frame 21 is provided with a wavelength selecting filter 25. Light 26 emitted from an ultra-high pressure mercury lamp not shown in the figure is incident on the wavelength selecting filter 25, and light in a specific wavelength region passes therethrough. The photocurable resin 22 is irradiated with light, which passed through the wavelength selecting filter 25, through the molding die 20, and the photocurable resin 22 is cured, by the light. An ejector 24 is provided for the support frame 21, and by pushing up the glass substrate 23 with this ejector 24, the photocurable resin 22, which has already been cured, is removed together with the glass substrate 23 from the molding die.

Figure 6A:
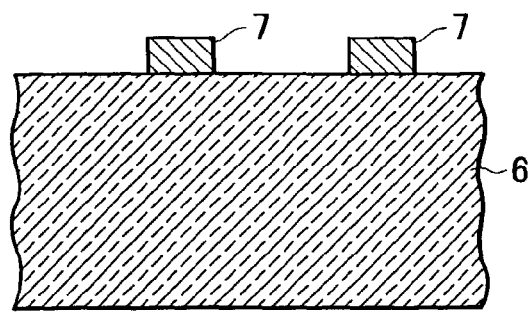
FIGS. 6A to 6D are schematic cross-sectional views for illustrating a process for forming a molding die.
Figure 6B:
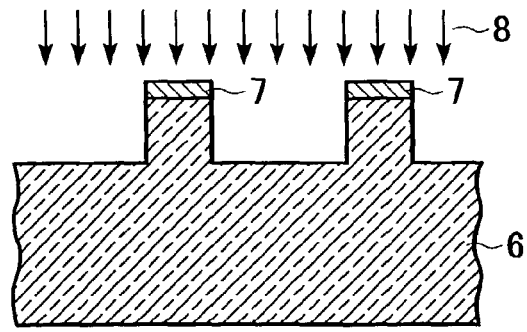
Figure 6C:
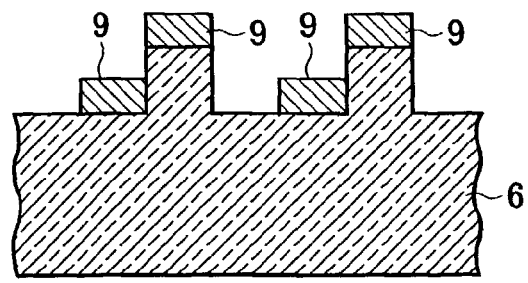
Figure 6D:
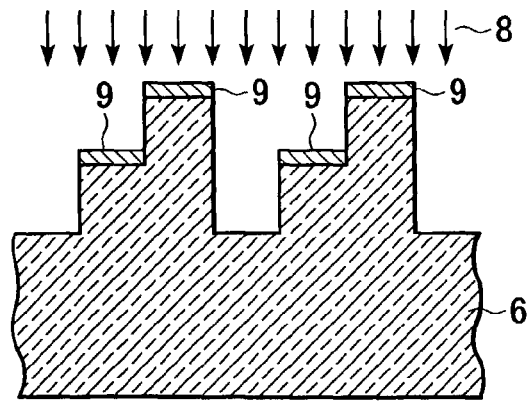

The molding die 20 shown in FIG. 5 is formed by a method shown in FIGS. 6A to 6D. FIGS. 6A to 6D are schematic cross-sectional views illustrating a process for forming the molding die. As shown in FIG. 6A, a photoresist film is first formed over the entire surface of quartz glass 6 and is then patterned by a well-known photolithography step, thereby forming a mask 7. Next, as shown in FIG. 6B, the quartz glass 6 is irradiated with ion beams 8, so that parts of the quartz glass 6, which are not covered with the mask 7, are etched by reactive ion beam (RIE) etching. Subsequently, after the mask 7 is removed, by the same method as that shown in FIG. 6A, a mask 9 as shown in FIG. 6C is formed on the quartz glass 6. Next, as shown in FIG. 6D, the quartz glass 6 is again irradiated with ion beams 8, so that parts of the quartz glass 6, which are not covered with the mask 9, are etched. When the mask 9 is finally removed, the molding die 20 having light transmitting properties shown in FIG. 5 can be formed.

Example 1

One example of a manufacturing method of the diffraction optical element, according to present invention, will be described with reference to FIGS. 5, and 8A to 8D. FIGS. 8A to 8D are views each showing only the glass substrate, the photocurable resin, and the molding die among the various elements shown in FIG. 5 for illustrating a curing process of a photocurable resin. In FIGS. 8A to 8D, the same reference numerals as those in FIG. 5 designate the same elements, and a detailed description thereof is omitted.

First, the support frame 21 was fitted to the molding die 20 shown in FIG. 5. A predetermined amount of the photocurable resin 22 was dripped onto the mold surface of this molding die 20 by using a dispenser not shown in the figure. After this photocurable resin 22 spread over the entire mold surface, a vacuum device, in which the molding apparatus shown in FIG. 5 was placed, was evacuated to approximately 10 mm Hg for defoaming. When the grating shape has a pitch of 40 µm and a grating height of 10 µm, air may be trapped in the finely designed shape described above when the resin spreads; however, by this defoaming step, the generation of structural defects caused by the air thus trapped could be prevented.

Next, a very small amount of a photocurable resin was dripped onto the center of the glass substrate 23, and this resin droplet and the photocurable resin 22, which has spread on the molding die 20, were first brought into contact with each other. Subsequently, after being slowly moved downward, the glass substrate 23 was supported at a predetermined position at which the ejector 24 is brought into contact therewith. Accordingly, a desired film thickness of the photocurable resin could be obtained.

Figure 7:
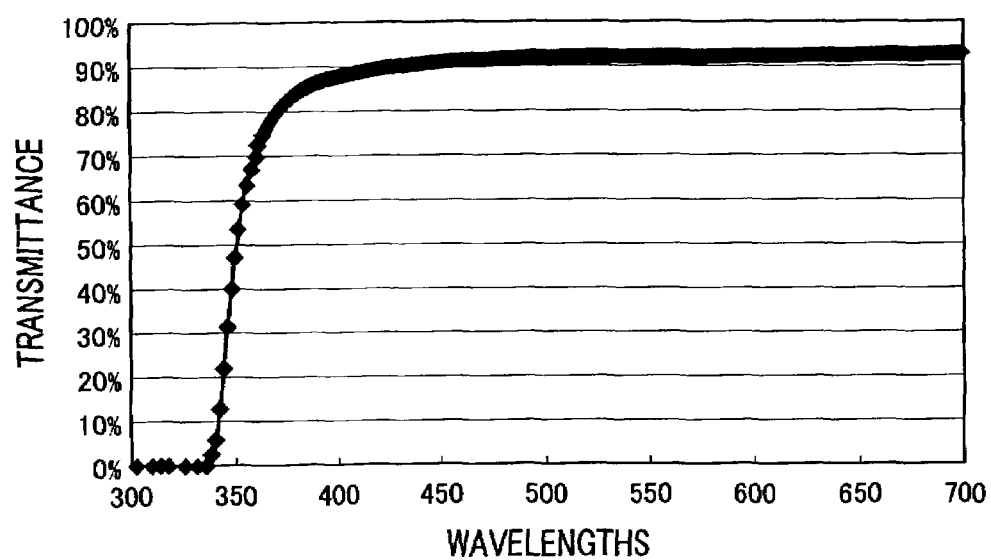
FIG. 7 is a graph showing a transmission spectrum of a photocurable resin used in Example 1 of the present invention.

Then, the first wavelength selecting filter 25 was fitted to the support frame 21, and the photocurable resin 22 was irradiated with the light 26 emitted from the ultra-high pressure mercury lamp not shown in the figure through the first wavelength selecting filter 25 and the molding die. The first wavelength selecting filter 25 allowed light having a wavelength of 230 to 260 nm to pass therethrough. On the other hand, the photocurable resin 22 had a large absorption spectrum in a region having a short wavelength of up to 340 nm, as shown in FIG. 7. FIG. 7 is a graph showing a transmission spectrum of the photocurable resin, in which the vertical axis indicates the transmission of the photocurable resin and in which the horizontal axis indicates the wavelength of light. A curing initiator was present in the photocurable resin. When light having a wavelength of more than 200 nm was used, this curing initiator could absorb the light described above and initiate a radical reaction.

Figure 8A:
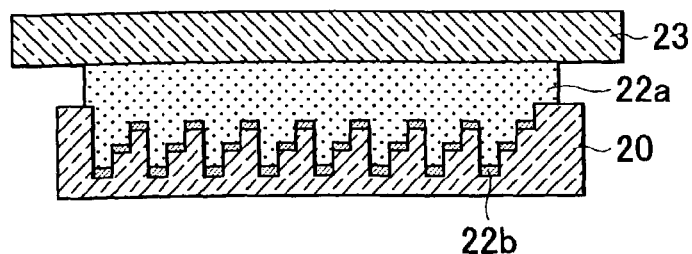
FIGS. 8A to 8D are schematic cross-sectional views for illustrating a curing process of a photocurable resin.

As described above, since the photocurable resin 22 had a large absorption spectrum for light having a short wavelength, the light that had a wavelength of 230 to 260 nm and that passed through the first wavelength selecting filter could not reach the resin located at the glass substrate side. Hence, as shown in FIG. 8A, only a part of the resin in contact with the molding die was cured, and the other part of the resin remained uncured. In FIGS. 8A to 8D, reference 22a indicates the remaining uncured resin portion, and reference numeral 22b indicates the cured resin portion.

Figure 8B:
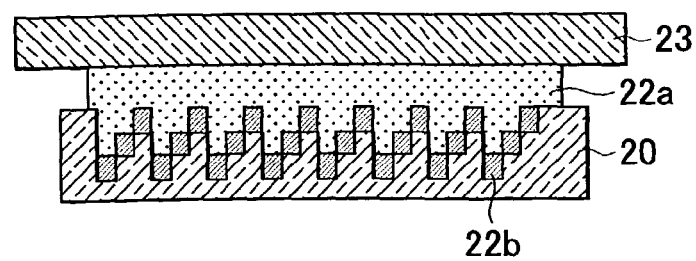

Next, the wavelength selecting filter shown in FIG. 5 was replaced with a second wavelength selecting filter, which allowed light having a wavelength of 260 to 290 nm to pass therethrough. The photocurable resin 22 was then irradiated with the light 26, which was emitted from the ultra-high pressure mercury lamp not shown in the figure, through this second wavelength selecting filter and the molding die. Since this light is in a long wavelength region compared to the light that passed through the first wavelength selecting filter, this light reached a deeper position in the photocurable resin. Accordingly, as shown in FIG. 8B, the cured portion 22b extended in the thickness direction of the resin.

Figure 8C:
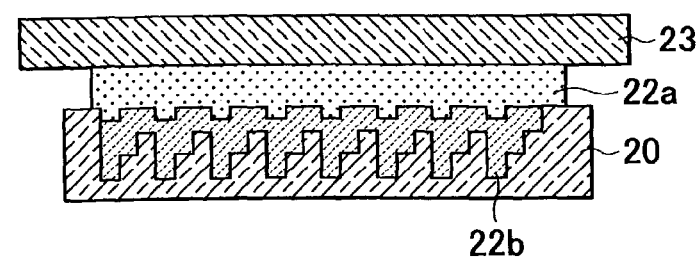

Subsequently, the wavelength selecting filter shown in FIG. 5 was replaced with a third wavelength selecting filter, which allowed light having a wavelength of 290 to 320 nm to pass therethrough. The photocurable resin 22 was then irradiated with the light 26, which was emitted from the ultra-high pressure mercury lamp not shown in the figure, through this third wavelength selecting filter and the molding die. Since this light was in a long wavelength region compared to the light that passed through the second wavelength selecting filter, as shown in FIG. 8C, the cured portion 22b further extended in the thickness direction of the resin.

Figure 8D:
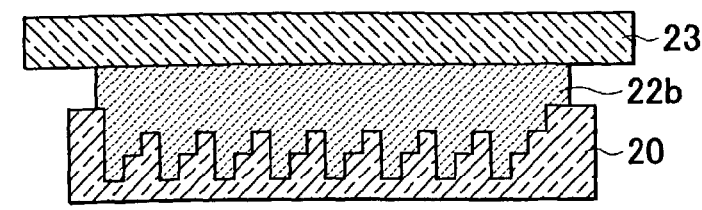

Finally, the wavelength selecting filter was removed, and the photocurable resin 22 was irradiated with the light 26, which was emitted from the ultra-high pressure mercury lamp not shown in the figure, through the molding die. As a result, as shown in FIG. 8D, the entire photocurable resin was cured.

The resin thus cured was removed from the molding die 20 together with the glass substrate 23 by pushing up the glass substrate 23 using the ejector 24 shown in FIG. 5, thereby forming an optical member.

In order to improve the adhesion with the resin, the glass substrate 23 used in this example was processed beforehand by the steps of applying a silane coupling agent onto the surface of the substrate 23 using a spinner and drying in an oven.

According to the present invention, since the photocurable resin is gradually cured form the molding die side provided with the fine pattern, the formation of gaps between the molding die and the resin, caused by rapid resin shrinkage, which occurs during curing, can be avoided. Hence a diffraction optical element having superior structural accuracy can be manufactured.

By the process described above, one of the optical members shown in FIGS. 2 and 3 was formed, and the other optical member can also be formed in the same manner as that described above. After the thus-formed one of the first and the second optical members was fitted to a fixing tool, a thixotropic photocurable adhesive having low fluidity was dripped at least at two locations along the outside periphery of the concave portion 16 or the convex portion 18. Next, the other optical member was bonded to the one optical member so that the blazed diffraction gratings opposed each other and so that the centers thereof roughly coincided with each other. In this step, since an interference fringe can be seen in the region in which the blazed diffraction gratings are formed, the alignment may be coarsely performed by using the fringe as a rough standard. After the concave portion 16 and the convex portion 18, which were formed around the peripheries, were engaged with each other, the adhesive was cured by irradiation with ultraviolet rays. Accordingly, the multilayer diffraction optical element shown in FIG. 1 was manufactured.

Example 2

A diffraction optical element was formed in the same manner as that in Example 1, except that the photocurable resin used in Example 1 was replaced with a photocurable resin that allowed light having a short wavelength (300 nm) to pass therethrough to some extent. In this example, in order to improve ultraviolet-ray absorption properties of the photocurable resin, an ultraviolet ray absorber (stabilizer) was added thereto. Since the photocurable resin used in this example was a urethane acrylate-based material, by adding a triazine-based ultraviolet ray absorber sold under the registered trade-name TINUVIN 400 by Ciba Specialty Chemicals Corporation, a resin having a large absorption spectrum for light having a wavelength of 346 nm or less can be obtained. In this example, a diffraction optical element having superior structural accuracy can also be manufactured.

In addition to the examples described above, the present invention can be modified in various ways. For example, in the examples described above, although the wavelength of light with which the photocurable resin is irradiated was changed in a stepwise manner, the wavelength of light may be continuously changed while the resin is irradiated therewith. The present invention may include all modifications as described above without departing from the following Claims.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing a diffraction optical element, comprising:
   a first step of supplying a photocurable resin onto a surface of a light-transmitting molding die in which a grating pattern is formed on the surface;
   a second step of irradiating the photocurable resin with light in a first wavelength band through the molding die so as to cure a first part of the photocurable resin, which said first part forms a diffraction grating in contact with the molding die;
   a third step of irradiating the photocurable resin with light in a second wavelength band, the light in the second wavelength band being longer than the light in the first wavelength band, so as to cure the photocurable resin not cured in the second step; and
   a fourth step of removing the cured resin from the molding die,
   wherein the light in the first wavelength band used to cure the first part that forms the diffraction grating is not transmittable through the entirety of the photocurable resin.

2. The method according to claim 1, wherein the photocurable resin comprises an ultraviolet ray absorber.

3. A method for manufacturing a diffraction optical element, comprising:
   a first step of supplying a photocurable resin onto a surface of a light transmitting molding die in which a grating pattern is formed on the surface;
   a second step of irradiating the photocurable resin through the molding die with light of a longer wavelength band than that of the light irradiated in the second step in a wavelength band not transmittable through the entirety of the photocurable resin so as to cure a first part of the photocurable resin, which said first part forms a diffraction grating in contact with the molding die,
   a third step of irradiating the photocurable resin with light to cure the photocurable resin not cured in the second step; and
   a fourth step of removing the cured resin from the molding die.

4. The method according to claim 1, wherein the first wavelength band is from 230 nm to 260 nm.

5. The method according to claim 3, wherein the wavelength band not transmittable through the photocurable resin is from 230 nm to 260 nm.

* * * * *

UNITED STATES PATENT AND TRADEMARK OFFICE
CERTIFICATE OF CORRECTION

| | | |
|---|---|---|
| PATENT NO. | : 7,294,293 B2 | Page 1 of 1 |
| APPLICATION NO. | : 10/438027 | |
| DATED | : November 13, 2007 | |
| INVENTOR(S) | : Masaaki Nakabayashi | |

It is certified that error appears in the above-identified patent and that said Letters Patent is hereby corrected as shown below:

ON THE TITLE PAGE (57):

Abstract, line 9 "firs" should read --first--.

COLUMN 3:

Line 45, "diffraction-grating" should read --diffraction grating--.

COLUMN 6:

Line 20, "form" should read --from--.

COLUMN 8:

Line 15, "of a longer wavelength band" should be deleted;
    Line 16, "than that of the light irradiated in the second step" should be deleted; and
    Line 22, "to" should read --of a longer wavelength band than that of the light irradiated in the second step to--.

Signed and Sealed this

Seventeenth Day of June, 2008

JON W. DUDAS
*Director of the United States Patent and Trademark Office*